United States Patent
Cousins et al.

(10) Patent No.: US 9,873,617 B2
(45) Date of Patent: Jan. 23, 2018

(54) METHOD FOR PRODUCING A SULPHIDED COPPER SORBENT

(71) Applicants: Matthew John Cousins, Lancashire (GB); David Davis, Durham (GB); Paul Rafferty, Cleveland (GB); Sarah Ridley, Cleveland (GB); Alan Gordon Tapster, Cleveland (GB)

(72) Inventors: Matthew John Cousins, Lancashire (GB); David Davis, Durham (GB); Paul Rafferty, Cleveland (GB); Sarah Ridley, Cleveland (GB); Alan Gordon Tapster, Cleveland (GB)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 327 days.

(21) Appl. No.: 14/382,171

(22) PCT Filed: Feb. 25, 2013

(86) PCT No.: PCT/GB2013/050453
§ 371 (c)(1),
(2) Date: Aug. 29, 2014

(87) PCT Pub. No.: WO2013/136046
PCT Pub. Date: Sep. 19, 2013

(65) Prior Publication Data
US 2015/0060729 A1 Mar. 5, 2015

(30) Foreign Application Priority Data

Mar. 16, 2012 (GB) .................................. 1204650.4

(51) Int. Cl.
| | | |
|---|---|---|
| *C01G 3/12* | (2006.01) | |
| *B01J 20/08* | (2006.01) | |
| *B01J 20/28* | (2006.01) | |
| *B01J 20/30* | (2006.01) | |
| *B01J 20/32* | (2006.01) | |
| *B01D 53/64* | (2006.01) | |
| *B01J 20/02* | (2006.01) | |
| *C10L 3/10* | (2006.01) | |
| *C10G 25/00* | (2006.01) | |
| *C10G 29/10* | (2006.01) | |
| *B01D 15/08* | (2006.01) | |

(52) U.S. Cl.
CPC .............. *C01G 3/12* (2013.01); *B01D 15/08* (2013.01); *B01D 53/64* (2013.01); *B01J 20/0237* (2013.01); *B01J 20/08* (2013.01); *B01J 20/2803* (2013.01); *B01J 20/3007* (2013.01); *B01J 20/3078* (2013.01); *B01J 20/3085* (2013.01); *B01J 20/3204* (2013.01); *B01J 20/3236* (2013.01); *C10G 25/003* (2013.01); *C10G 29/10* (2013.01); *C10L 3/101* (2013.01); *B01D 2253/1128* (2013.01); *B01D 2256/24* (2013.01); *B01D 2257/602* (2013.01); *B01D 2258/05* (2013.01); *B01J 2220/42* (2013.01); *B01J 2220/56* (2013.01); *C10L 2290/542* (2013.01)

(58) Field of Classification Search
CPC ..... C01G 3/12; B01J 20/3078; B01J 20/3236; B01J 20/0237; B01D 53/64; B01D 15/08
USPC ............... 252/193; 423/561.1, 210; 427/380; 210/660
See application file for complete search history.

(56) References Cited

U.S. PATENT DOCUMENTS

| | | |
|---|---|---|
| 4,094,777 A | 6/1978 | Sugier et al. |
| 5,245,106 A | 9/1993 | Cameron et al. |
| 5,350,728 A | 9/1994 | Cameron et al. |
| 2007/0134143 A1 | 6/2007 | Carnell |

FOREIGN PATENT DOCUMENTS

| | | |
|---|---|---|
| GB | 2 428 598 A | 2/2007 |
| WO | 2005/047438 A1 | 5/2005 |
| WO | 2008/020250 A1 | 2/2008 |
| WO | 2009/101429 A1 | 8/2009 |
| WO | 2010/061212 A1 | 6/2010 |

OTHER PUBLICATIONS

International Search Report, dated Jun. 6, 2013, from corresponding PCT application.
GB Search Report, dated Jul. 31, 2013, from corresponding GB application.
GB Search Report, dated Jul. 13, 2013, from corresponding GB application.

*Primary Examiner* — Matthew E Hoban
*Assistant Examiner* — James Fiorito
(74) *Attorney, Agent, or Firm* — Young & Thompson

(57) ABSTRACT

A method for producing a sulphided copper sorbent includes the steps of: (i) contacting a sorbent precursor material containing one or more sulphidable copper compounds, with a sulphiding gas stream including hydrogen sulphide to form a sulphided sulphur-containing sorbent material, and (ii) subjecting the sulphided sulphur-containing sorbent material to a heating step in which it is heated to a temperature above that used in the sulphiding step and ≥110° C., under an inert gas selected from nitrogen, argon, helium, carbon dioxide, methane, and mixtures thereof, the inert gas optionally including hydrogen sulphide. The method provides sulphided copper sorbents that have reduced levels of elemental sulphur.

25 Claims, No Drawings

METHOD FOR PRODUCING A SULPHIDED COPPER SORBENT

This invention relates to methods for producing sulphided copper-containing sorbents suitable for removing heavy metals, particularly mercury from process fluids.

Heavy metals such as mercury may be found in a number of fluids used or created by industrial processes, particularly those derived from coal, crude oil and some natural gas reserves. Their removal is necessary for the safe and environmentally sound processing of these fluids.

Copper sulphide based sorbents for mercury are known. U.S. Pat. No. 4,094,777 discloses a process for removal of mercury in a gas or liquid using an adsorption mass consisting of a mineral support such as silica, alumina, silicates, aluminates and silico-aluminates, impregnated with copper. At least 30%, preferably at least 80%, of the copper is present in the sulphide form (CuS) in an amount of 2 to 65% of the weight of the mass. The adsorption mass preferably also contains silver, which was found to be necessary to achieve satisfactory sulphidation when using hydrogen sulphide as the sulphiding agent at ambient temperature. Without silver, it was necessary to sulphide at 280° C. to achieve the same level of sulphiding, which is a penalty in energy and equipment cost.

WO 2008/020250 discloses high strength granulated mercury sorbents formed from copper-zinc-alumina compositions using a combination of cement and clay binders. The sorbent precursor materials were taken to a fully sulphided state using 1% v/v $H_2S$ in an inert carrier gas, (typically $N_2$ or $CH_4$) at ambient temperature and pressure.

WO 2009/101429 discloses zinc-free granulated mercury sorbents formed from a particulate sulphided copper compound, a particulate support and one or more binders. The sorbent precursor materials were again taken to a fully sulphided state using 1% v/v $H_2S$ in an inert carrier gas, (typically $N_2$) at ambient temperature and pressure in laboratory apparatus to generate the active sorbent.

WO2010/061212 discloses a reduced copper sulphide sorbent for removing heavy metals from fluid streams prepared by sulphiding a sorbent precursor and reducing the sulphided copper material.

WO2005/047438 discloses the removal of mercury compounds from glycol. In one example, a commercially available absorbent was treated with hydrogen sulphide and heated to 100° C. for about 2 hours in flowing methane.

The limitations of the current processes when performed at an industrial scale include the presence of elemental sulphur when materials are discharged following sulphiding, which may be released or produced from the sorbents in use, leading to considerable operating difficulties, particularly in liquid duties.

We have developed a sulphiding method that overcomes the problems inherent in the previous methods.

Accordingly, the invention provides a method for producing a sulphided copper sorbent, comprising the steps of: (i) contacting a sorbent precursor material containing one or more sulphidable copper compounds, with a sulphiding gas stream comprising hydrogen sulphide to form a sulphided sulphur-containing sorbent material, and (ii) subjecting the sulphided sulphur-containing sorbent material to a heating step in which it is heated to a temperature above that used in the sulphiding step and $\geq 110°$ C., under an inert gas selected from nitrogen, argon, helium, carbon dioxide, methane, and mixtures thereof, said inert gas optionally comprising hydrogen sulphide.

The invention further provides the product obtainable by the method and a process for removing heavy metals, particularly mercury, from fluid streams by contacting the fluid stream with the sorbent.

Herein by the term "sorbent" we include "adsorbent" and "absorbent".

The term "heavy metals" includes mercury, arsenic, lead, cadmium, antimony, tin, copper, nickel, zinc, chromium, selenium, platinum, palladium and gold, particularly mercury and arsenic.

The present invention is particularly useful for the large-scale pre-sulphiding of copper sorbents suitable for heavy metal recovery from liquid and gaseous process fluids. The term "pre-sulphiding" means that the sulphiding step is performed before the sorbent is exposed to the process fluid containing the heavy metal, preferably using separate pre-sulphiding equipment.

Thus in a preferred method, a fixed bed of a particulate copper-containing sorbent precursor material is placed in a sulphiding vessel and the sulphiding gas stream passed through the bed. The flow through the bed may be axial or radial.

The sorbent precursor that may be treated using the method of the present invention may comprise 1 to 75% by weight of copper; however preferred sorbent precursors comprise 5 to 50% by weight copper. In order to provide process-efficient materials that allow for suitable sorption vessel sizes, it is preferred that the density of the sorbent, expressed as the sulphur density, is in the range 20 to 400 kg $S/m^3$, preferably 20 to 200 kg $S/m^3$. The sulphur density may be determined by measuring the total sulphur content by weight and determining the tapped bulk density in $kg/m^3$, which may be measured by tapping 100 ml of sorbent in a measuring cylinder to a constant volume.

The sulphidable copper compound in the sorbent precursor preferably comprises copper oxide and/or basic copper carbonate. The sorbent precursor may be formed by impregnating a support material with a solution of a soluble copper salt, such as copper nitrate or copper acetate, followed by drying and optionally calcining the impregnated support to convert the copper compound to copper (II) oxide. Alternatively, the sorbent precursor may be formed by coating a support material with a slurry, e.g. an aqueous slurry of an insoluble copper compound such as copper oxide or basic copper carbonate, followed by drying and optionally calcining the impregnated support. Alternatively, sorbent precursors, particularly those comprising 20 to 75%, preferably 20 to 40%, copper by weight, may be formed by combining an oxide, hydroxide, carbonate or hydroxycarbonate of copper, optionally comprising one or more further sulphidable metal compounds such as zinc, with one or more binders and optionally a support material. The binder may be selected from the group consisting of clays, cements and organic polymer binders, or a mixture thereof. The support material in the sorbent precursor made by any of these routes may be selected from the group consisting of alumina, hydrated alumina, metal-aluminate, silica, titania, zirconia, zinc oxide, aluminosilicates, zeolites or a mixture thereof.

Preferred sorbent precursors in the process of the present invention are those based on copper hydroxycarbonate precursors, for example the copper-zinc-hydroxycarbonate precursors described in the aforesaid WO 2008/020250. Particularly preferred sorbent precursors in the process of the present invention are free of zinc compounds, for examples as described in the aforesaid WO 2009/101429.

The sorbent precursor may be in the form of a pellet, extrudate or granule, which may be prepared using conventional techniques. Cylindrical pellets, such as Raschig rings and lobed extrudates offer reduced pressure drop, whereas spherical granules may be simpler to handle and load. The pellet, extrudate or granule desirably has a minimum dimension, i.e. length or width, in the range 1 to 15 mm and a maximum dimension in the range 1 to 25 mm, with an aspect ratio (longest dimension divided by shortest dimension) ≤4. Preferred sorbent precursors are spheres with a diameter in the range 1 to 10 mm, preferably 1 to 5 mm, more preferably 2 to 5 mm.

Alternatively, the sorbent precursor may be in the form of a monolith such as honeycomb, structured packing or foam coated with a sulphidable copper compound but this is less preferred.

The sulphiding gas stream may be pure hydrogen sulphide but preferably comprises a mixture of hydrogen sulphide and one or more inert carrier gases such as nitrogen, argon, helium, carbon dioxide or methane. In addition to hydrogen sulphide, one or more other gaseous sulphiding compounds, such as carbon disulphide or carbonyl sulphide may be present. In a preferred embodiment, the sulphiding gas stream comprises 0.25 to 80% hydrogen sulphide by volume and an inert carrier gas selected from carbon dioxide and nitrogen. Preferably, the hydrogen sulphide content of the sulphiding gas stream is in the range 0.5 to 10.0% by volume, more preferably 0.7 to 4.5% by volume, most preferably 1.5 to 3.5% by volume. The concentration of hydrogen sulphide may be varied within this range if desired. The sulphiding gas mixture fed to the sorbent precursor may be purified to reduce the level of oxidant to the required level using known oxidant scavengers/sorbents. Purification systems that will scrub the hydrogen sulphide gas stream to remove sulphur oxides, such as $SO_2$, are particularly beneficial.

The pressure of the sulphiding gas stream may be in the range $6.9 \times 10^3$ to $6.9 \times 10^5$ Pag, preferably $6.9 \times 10^3$ to $13.8 \times 10^4$ Pag (1 to 100 psig, preferably 1 to 20 psig).

The sulphiding gas stream is preferably a flowing stream with a linear velocity ≥0.1 meters/second, preferably ≥0.4 meters/second, but below the fluidisation velocity of the sorbent precursor or sulphided sorbent product. The fluidisation velocity is the linear velocity that causes the fixed bed to be fluidised. Operating in this range reduces the attrition of the sorbent and so the formation of undersized fines, while effectively removing the heat of reaction. It also provides sufficient hydrogen sulphide to fully sulphide the sorbent precursor efficiently at an industrial scale. The linear velocity of the sulphiding gas mixture in the aforesaid WO 2008/020250 and WO 2009/101429 is calculated at 0.04 m/s, which is too low for commercial operation.

Both the flow-rate of sulphiding gas and the $H_2S$ concentration may be varied during the sulphiding step to produce the sorbent.

Desirably the sulphiding gas stream is re-circulated to the sorbent precursor using a re-circulator. A purge may be taken from the re-circulating gas stream to prevent the build-up of by-products that may affect the sulphidation reaction and prevent the pressure in the loop increasing. Preferably, water that may be formed during the sulphiding step may be condensed and removed from the re-circulating gas stream.

The total oxidant content of the sulphiding gas stream is desirably ≤1.0%, by volume to prevent the gross formation of elemental sulphur on the sorbent during the sulphiding step. More preferably however, the total oxidant content is ≤0.1% by volume, more preferably ≤0.01% by volume and most preferably ≤0.001% by volume in the sulphiding gas stream to minimise any elemental sulphur formation. The oxidant may be any oxidant that causes elemental sulphur to form including a mixture of such oxidants. Such oxidants include free oxygen ($O_2$), sulphur oxides such as sulphur dioxide ($SO_2$) and nitrogen oxides such as nitrogen dioxide ($NO_2$). The sulphiding step nevertheless will result in the formation of some elemental sulphur on the sorbent and so the product of the sulphiding step is a sulphur-containing sorbent.

The sulphiding step may be performed at an inlet temperature in the range 0-150° C., preferably 20-100° C., for up to 24 hours. For sorbents comprising basic copper carbonate the sulphiding step is desirably performed at an inlet temperature in the range 1 to 100° C., more preferably 5 to 50° C., most preferably ≤30° C. Lower temperatures may be preferred to minimise the thermal stresses in sorbents containing relatively high copper contents. The temperature may be controlled using the concentration of the hydrogen sulphide in combination with cooling the sulphiding gas stream and/or other cooling means such as heat exchange tubes or plates in the sorbent bed. The temperature may be suitably controlled by monitoring the exit temperature of the sulphiding gas from the sulphiding vessel, or by a series of thermocouples suitably located in the bed.

Where the sorbent precursor comprises copper oxide or basic copper carbonate, the reaction with hydrogen sulphide generates water. At low levels we have found surprisingly that this can have a beneficial effect on sorbents, particularly those comprising a cement binder. Thus preferably the sulphiding gas stream fed to the sorbent comprises water vapour. This may suitably be achieved by passing at least a portion of the carrier gas or the sulphiding gas through water or by adding water vapour to the gas stream. Hence, 10 to 60% by volume, more preferably 20 to 50% by volume, of the sulphiding gas fed to the sorbent precursor may be saturated with water vapour at ambient conditions. Alternatively, the removal of water from a re-circulating sulphiding gas stream may be controlled to allow a portion of the water to remain in the gas mixture fed to the sorbent precursor. We have found water levels in the sulphiding gas stream in the range 0.2 to 2.0% by volume to be particularly beneficial. At higher levels, the water may condense out in the pores of the sorbent precursor and sorbent as it forms, which can negatively impact the physical properties of the final product. Therefore preferably the conditions are arranged such that water does not condense on the sorbent or precursor. This may be achieved by employing a relatively high velocity of sulphiding gas and, where the sulphiding gas stream is re-circulated to the sorbent precursor, by removing at least a portion of the formed water. Conventional water removal methods may be used such as cooling/separation and/or employing water sorbents such as molecular sieves.

The sorbent precursor may be deliberately partially sulphided using the present method, i.e. a proportion of the sulphidable copper compounds remains after the sulphiding step. However, this can lead to unwanted side-reactions in use. Therefore it is preferred that the sorbent precursor material is contacted with the sulphiding gas stream for sufficient time to fully sulphide the sulphidable copper in the precursor material. The time to achieve this will depend on factors such as the hydrogen sulphide concentration and temperature used but desirably the sulphiding step is performed for ≤12 hours, preferably ≤8 hours.

Where other sulphidable compounds are present in the sorbent, e.g. zinc compounds or components of binders, preferably these are also fully sulphided.

The process of the present invention further comprises subjecting the sulphided sulphur-containing sorbent material to a heating step in which it is heated to a temperature above that used in the sulphiding step. Preferably, the temperature in the heating step is 40 or more degrees centigrade higher than the maximum temperature used in the sulphiding step. The heating step temperature is ≥110° C., preferably ≥125° C., and in particular ≥140° C. For sorbent precursors comprising basic copper carbonate the sulphur-containing sorbent material is preferably heated to a temperature in the range 140 to 200° C., preferably 160 to 200° C., most preferably 160 to 180° C. This heating step removes the elemental sulphur, preferably to below the detection limit.

The heating step may be performed under non-sulphiding conditions or sulphiding conditions. The heating step is performed under an inert gas selected from nitrogen, argon, helium, carbon dioxide, methane, and mixtures thereof, said inert gas optionally comprising hydrogen sulphide and is preferably performed under the same inert carrier or purge gases or a mixture of inert gas and $H_2S$ as used during the sulphiding step. The $H_2S$ content may be the same or lower than that used during the sulphiding step, but is preferably lower, and is preferably in the range 0 to 0.75% vol, more preferably 0 to 0.7% by volume. The period of heating is desirably minimised to prevent decomposition of the copper sulphide present in the sorbent, and may be in total in the range 0.5 to 8 hours. The heating step may be performed immediately after the sulphiding step and may be performed under a static or flowing gas stream as described above.

In a preferred embodiment, a sorbent precursor comprising basic copper carbonate is sulphided using a sulphiding gas stream comprising 1-5% vol $H_2S$ in $CO_2$ at ≤30° C., and then the resulting sulphur-containing sorbent subjected to a heat treatment under a $CO_2$ gas stream comprising 0-0.7% vol $H_2S$ at 160-180° C.

The sulphided copper sorbent will comprise copper (II) sulphide. Copper (II) sulphide is unstable to reducing process fluids such as hydrogen-containing process gas streams. We have found that sorbents in which a portion of the copper (II) sulphide has been reduced to contain copper (I) may be effective in removing heavy metals from such streams. The copper (I)-containing sulphide may conveniently be produced by pre-reducing the sulphided sorbent. Accordingly, the process may further comprise reducing the sulphided sorbent material in a hydrogen-containing gas stream to produce a reduced sorbent comprising copper (I). The temperature should be carefully controlled during reduction to maintain the integrity of the sorbent. Preferably the reduction is performed at a temperature in the range 200 to 250° C. Hydrogen concentrations from 1 to 100% may be used in a suitable inert gas such as nitrogen or carbon dioxide. To avoid undesirable side reactions, preferably the reduction is performed on sulphided copper sorbents having a degree of sulphidation ≥99% by weight.

The invention includes a sulphided copper-containing sorbent prepared according to the method. It is a feature of the present invention that the discharged sulphided sorbent obtained by the present method contains low levels or no detectable amounts of elemental sulphur. In prior art procedures, where sulphur loadings in excess of the theoretical amount are routinely observed it appears that elemental sulphur is the cause. Thus in a particularly preferred embodiment, the sulphur present in the sulphided sorbent prepared according to the present method is essentially in the form of one or more copper sulphides.

The sorbents prepared according to the procedure of the present invention desirably have a mean crush strength ≥0.5 kg and a tapped bulk density in the range 0.4 to 1.7 kg/l. The attrition loss of the sorbent, as measured by a drum tumbling method, is preferably ≤5% w/w, more preferably ≤2% w/w.

The invention includes a process for removing mercury from a liquid or gaseous process fluid comprising the step of contacting the process fluid with the sorbent, or prepared according to the method, described herein. The sorbents prepared by the method of the present invention may be used to treat both liquid and gaseous fluids containing heavy metals such as mercury, arsenic or antimony. In one embodiment, the fluid is a hydrocarbon stream. The hydrocarbon stream may be a refinery hydrocarbon stream such as naphtha (e.g. containing hydrocarbons having 5 or more carbon atoms and a final atmospheric pressure boiling point of up to 204° C.), middle distillate or atmospheric gas oil (e.g. having an atmospheric pressure boiling point range of 177° C. to 343° C.), vacuum gas oil (e.g. atmospheric pressure boiling point range 343° C. to 566° C.), or residuum (atmospheric pressure boiling point above 566° C.), or a hydrocarbon stream produced from such a feedstock by e.g. catalytic reforming. Refinery hydrocarbon steams also include carrier streams such as "cycle oil" as used in Fluidised Catalytic Cracking processes and hydrocarbons used in solvent extraction. The hydrocarbon stream may also be a crude oil stream, particularly when the crude oil is relatively light, or a synthetic crude stream as produced from tar oil or coal extraction for example. Gaseous hydrocarbons may be treated using the process of the invention, e.g. natural gas or refined paraffins or olefins, for example. Off-shore crude oil and off-shore natural gas streams in particular may be treated. Contaminated fuels such as petrol or diesel may also be treated. Alternatively, the hydrocarbon may be a condensate such as natural gas liquid (NGL) or liquefied petroleum gas (LPG), or gases such as a coal bed methane, shale gas, landfill gas or biogas.

Non-hydrocarbon fluids which may be treated according to the invention include carbon dioxide, which may be used in enhanced oil recovery processes or in carbon capture and storage, solvents for decaffeination of coffee, flavour and fragrance extraction, solvent extraction of coal etc. Fluids, such as alcohols (including glycols) and ethers used in wash processes or drying processes (e.g. triethylene glycol, monoethylene glycol, propylene carbonate, Rectisol™, Purisol™ and methanol), may be treated by the inventive process. Heavy metals, particularly mercury, may also be removed from amine streams used in acid gas removal units. Natural oils and fats such as vegetable and fish oils may be treated by the process of the invention, optionally after further processing such as hydrogenation or transesterification e.g. to form biodiesel.

Other fluid streams that may be treated include the regeneration gases from dehydration units, such as molecular sieve off-gases, or gases from the regeneration of glycol driers.

In a further preferred embodiment, wherein the process fluid is a reducing gas stream comprising hydrogen, or a liquid containing dissolved $H_2$, the sorbent is desirably one in which the degree of sulphidation of the copper is >99% by weight and which has been subjected to a subsequent reduction at a temperature in the range 200 to 250° C. with a hydrogen containing gas to form a copper (I)-containing sulphide.

The invention is of particular utility where the process fluid is a liquid capable of solubilising elemental sulphur.

Preferably the sorption of heavy metals, particularly mercury is conducted at a temperature below 150° C., preferably at or below 120° C. in that at such temperatures the overall capacity for mercury absorption is increased. While temperatures as low as 4° C. may be used to good effect, a preferred temperature range is 10 to 60° C.

Mercury may be in the form of elemental mercury, or organomercuric, or organomercurous compounds. The sorbents are particularly effective in removing elemental mercury although other forms of mercury may be removed for short periods. Typically the concentration of mercury in a gaseous feed stream is from 0.01 to 1100 μg/Nm$^3$, and more usually between 10 to 600 μg/Nm$^3$. Similar levels may be found in liquid streams.

In use, the sorbent material may be placed in a sorption vessel and the fluid stream containing heavy metal is passed through it. Desirably, the sorbent is placed in the vessel as one or more fixed beds according to known methods. More than one bed may be employed and the beds may be the same or different in composition. The gas hourly space velocity through the sorbent may be in the range normally employed.

The invention is further illustrated by reference to the following Examples.

In the Examples the following test methods were employed.

Sulphur content: The total sulphur content in the sulphided sorbent was determined using a LECO SC-632 instrument that combusts the samples and measures the sulphur oxides released using infra-red spectroscopy. Approximately 0.25 g of the sample is combusted in $O_2$ to create a $SO_x$ rich gas stream. IR analysis is then utilised to determine the level of $SO_x$ in the stream and this is related back to the weight of sample analysed to provide a total sulphur content, expressed by weight, for each sample.

Elemental sulphur level in the sulphided sorbent: The elemental sulphur (i.e. $S_8$) content of the sulphided sorbents was determined using a Soxhlet extraction method. 10 g of sulphided sorbent material were weighed into an extraction thimble, and extracted using 200 ml of refluxing hexane. The sample was allowed to reflux for 4 hours. Once the system was cool, the sample was removed and 2 ml of the resulting liquor placed into a GC vial. Analysis of the sample for elemental sulphur was then carried out using a calibrated GC-Pulse-Flame-Photometric-Detector. The standard used was elemental sulphur dissolved in heptane. From the calibration curve, a value for elemental sulphur in the extracted liquid was determined.

EXAMPLE 1

A sorbent precursor according to WO 2009/101429 was prepared by granulating basic copper carbonate with alumina tri-hydrate and a combination of cement and clay binders. The granules were dried at 105° C. The size range of the granules was 2.00 to 4.75 mm. The details are given in Table 1.

TABLE 1

| Basic copper carbonate (% w/w) | Alumina tri-hydrate (% w/w) | Cement and Clay binders (% w/w) |
| --- | --- | --- |
| 30.7 | 44.7 | 24.6 |

The sorbent precursor was sulphided using laboratory apparatus that allowed between 10 and 100 g of precursor to be sulphided by passing $H_2S$ in a carrier gas through a bed of the sorbent precursor disposed in a 20 mm diameter tubular sulphiding vessel at different temperatures. The total gas flow of sulphiding gas could be varied in the range 25 to 2500 Nl/hr. The carrier gas composition could be varied to include one or more of $N_2$, $CO_2$ and $H_2$. High purity gases were used throughout. At least a portion of the carrier gas could be passed through a water bubbler at ambient temperate and pressure. $H_2S$ was added to the carrier gas at the reactor inlet such that the inlet $H_2S$ concentration could be set in the range 0.1 to 10% vol. The sulphur content of the sulphiding gas was determined using Drager™ gas detection tubes. The temperature of the system was controlled either by a chiller unit just prior to the inlet to the reactor or by an electrically-powered radiant heating device clamped to the reactor. The temperature of the sorbent in the sulphiding vessel was measured by means of a thermo-couple in the precursor bed. In each case, the sulphiding step was carried out just above atmospheric pressure, 1 to 12 psig (6.9×10$^3$ Pag to 8.3×10$^4$ Pag). Before and after the sulphiding step, the sulphiding vessel was purged for at least 30 minutes with carrier gas.

In a first comparative example, 4 beds of the sorbent precursor, each of 20 cm$^3$ (18.5 g), were charged into the sulphiding apparatus. The apparatus was operated in an up-flow configuration, and it was purged with $CO_2$ to remove residual air. A sulphiding gas mixture comprising 3% $H_2S$ in $CO_2$ was passed over the sorbent at a flow rate of 915 l/hr at ambient temperature (20 to 25° C.) and pressure for 60 mins (sulphiding time). The concentration of $H_2S$ in the reactor inlet was checked with a Dräger™ tube. 40% vol of the sulphiding gas stream was passed through a water bubbler upstream of the sorbent.

After sulphiding, the reactor heater was turned off and the process gas was changed to a pure $CO_2$ purge. After reaching ambient temperature, the gas was turned off and the sorbent beds were discharged. The inlet bed was tested by Soxhlet extraction and by LECO analysis, as described above.

In a second comparative example the procedure was repeated except that the sulphiding step was performed for 120 minutes. Again, after sulphiding the sulphur-containing sorbent was not subjected to a heating step.

The results of these experiments are shown in Table 2. The results demonstrate that elemental sulphur is formed during sulphiding of the sorbent precursor and that varying the duration of the sulphiding process results in different levels of elemental sulphur on the sorbent.

EXAMPLE 2

The method of Example 1 was repeated, with an additional heating step applied to the sulphided sulphur-containing sorbent. The same sorbent precursor was subjected to the same sulphiding method with a sulphiding time of 120 minutes. Following the sulphiding step, the concentration of $H_2S$ in $CO_2$ was lowered to 0.5%, and the total flow rate was adjusted to maintain 915 l/hr gas flow. A temperature ramp was then applied to the reactor to heat the sulphided sulphur-containing sorbent to 175° C. (thermal treatment temperature) over 90 mins (ramp time). The temperature of 175° C. was held for a further 30 mins. This period is defined as the dwell time.

After the heat treatment, the reactor heater was turned off and the process gas was changed to a pure $CO_2$ purge. After reaching ambient temperature, the gas was turned off and the sorbent beds were discharged. The inlet bed inlet was tested by Soxhlet extraction and by LECO analysis.

The procedure was repeated with variation of the sulphiding time, ramp time and dwell time.

The results are shown in Table 2. Comparison of the results shows that a post sulphiding temperature treatment of 175° C. is sufficient to eliminate elemental sulphur from the sulphided sorbent, down to a level below the limit of detection of the GC technique (0.1 ppm). The results also show that the thermal treatment temperature of 175° C. is very effective at reducing elemental sulphur levels for a range of processing conditions.

It is observed that the shorter sulphiding time and longer dwell time for runs 5 and 6 would logically favour lower elemental sulphur compared with run 2. However it appears, surprisingly, that the thermal treatment temperature of 150° C. used in run 5 and 125° C. used in run 6 are less effective at eliminating elemental sulphur than the 175° C. used in runs 1-4.

TABLE 2

| Example | Sulphiding time (min) | Ramp time (min) | Dwell time (min) | Thermal treatment temperature (° C.) | Elemental sulphur (ppm) | Total sulphur (wt. %) |
|---|---|---|---|---|---|---|
| Comparative run 1 | 60 | — | — | — | 34 | 8.5 |
| Comparative run 2 | 120 | — | — | — | 60 | 8.0 |
| 2 run 1 | 120 | 90 | 30 | 175 | N.D. | 8.1 |
| 2 run 2 | 180 | 90 | 0 | 175 | N.D. | 8.5 |
| 2 run 3 | 60 | 60 | 0 | 175 | N.D. | 8.5 |
| 2 run 4 | 65 | 60 | 0 | 175 | N.D. | 8.9 |
| 2 run 5 | 90 | 90 | 60 | 150 | 0.4 | 8.3 |
| 2 run 6 | 65 | 90 | 150 | 125 | 1.9 | 8.6 |

(N.D.: none detected. The detection limit of the GC method was 0.1 ppm.)

The invention claimed is:

1. A method for producing a sulphided copper sorbent, comprising the steps of: (i) contacting a sorbent precursor material containing one or more sulphidable copper compounds, with a sulphiding gas stream comprising hydrogen sulphide and an inert gas selected from nitrogen, argon, helium, carbon dioxide, methane, and mixtures thereof to form a sulphided sulphur-containing sorbent material, and (ii) subjecting the sulphided sulphur-containing sorbent material to a heating step in which it is heated to a temperature above that used in the sulphiding step and ≥110° C., under a gas consisting of an inert gas selected from nitrogen, argon, helium, carbon dioxide, methane, and mixtures thereof, or a gas consisting of hydrogen sulphide and an inert gas selected from nitrogen, argon, helium, carbon dioxide, methane, and mixtures thereof.

2. A method according to claim 1 wherein the precursor is formed by combining an oxide, hydroxide, carbonate or hydroxycarbonate of copper or copper and zinc, with one or more binders or by combining an oxide, hydroxide, carbonate or hydroxycarbonate of copper or copper and zinc, with one or more binders and a support material.

3. A method according to claim 1 wherein the sorbent precursor is formed by impregnating a support material with a solution of a soluble salt of copper, followed by drying the impregnated support or by impregnating a support material with a solution of a soluble salt of copper, followed by drying and calcining the impregnated support.

4. A method according to claim 1 wherein the sorbent precursor is formed by coating a support material with a slurry of an insoluble copper compound, followed by drying the coated support or by coating a support material with a slurry of an insoluble copper compound, followed by drying and calcining the coated support.

5. A method according to claim 2 wherein the support material is selected from the group consisting of alumina, hydrated alumina, metal-aluminate, silica, titania, zirconia, zinc oxide, aluminosilicates, zeolites, or a mixture thereof.

6. A method according to claim 1 wherein the hydrogen sulphide content of the sulphiding gas stream is 0.25 to 80% by volume.

7. A method according to claim 1 where the pressure of the sulphiding gas stream is in the range 1 to 100 psig.

8. A method according to claim 1 wherein the sulphiding gas stream comprises an oxidant selected from one or more of free oxygen ($O_2$), sulphur oxides and nitrogen oxides, and has a total oxidant content of ≤1%.

9. A method according to claim 1 wherein the inlet temperature for the sulphiding step is in the range 0-150° C.

10. A method according to claim 1 wherein the sulphiding gas stream is passed through a fixed bed of the sorbent precursor at a linear velocity ≥0.1 m/s but less than the fluidization velocity.

11. A method according to claim 1 wherein the sulphiding gas stream comprises water vapour.

12. A method according to claim 1 wherein the sulphiding gas stream has a water vapour level in the range 0.2 to 2.0% by volume.

13. A method according to claim 1 wherein the sulphur-containing sorbent material is heated to a temperature in the heating step that is 40 or more degrees centigrade higher than the maximum temperature in the sulphiding step.

14. A method according to claim 1 wherein the sulphur-containing sorbent material is heated to a temperature ≥125° C.

15. A method according to claim 1 wherein the sorbent precursor comprises basic copper carbonate and the sulphur-containing sorbent material is heated to a temperature in the range 140 to 200° C.

16. A method according to claim 1 wherein the heating step is performed under an inert gas selected from nitrogen, argon, helium, carbon dioxide, methane, and mixtures thereof, said inert gas comprising hydrogen sulphide at a concentration lower than that used in the sulphiding step.

17. A method according to claim 1 further comprising reducing the sulphided sorbent material in a hydrogen containing gas stream to produce a reduced copper sorbent.

18. A method according to claim 1 wherein the hydrogen sulphide content of the sulphiding gas stream is 0.5 to 10% by volume.

19. A method according to claim 1 wherein the hydrogen sulphide content of the sulphiding gas stream is 0.75 to 4.5% by volume.

20. A method according to claim 1 where the pressure of the sulphiding gas stream is in the range 1 to 20 psig.

21. A method according to claim 1 wherein the sulphiding gas stream comprises an oxidant selected from one or more of free oxygen ($O_2$), sulphur oxides and nitrogen oxides, and has a total oxidant content of ≤0.01% by volume.

22. A method according to claim 1 wherein the inlet temperature for the sulphiding step is in the range 20-100° C.

23. A method according to claim 1 wherein the sulphur-containing sorbent material is heated to a temperature ≥140° C.

24. A method according to claim 1 wherein the sorbent precursor comprises basic copper carbonate and the sulphur-containing sorbent material is heated to a temperature in the range 160 to 200° C.

25. A method according to claim 1 wherein the sorbent precursor comprises basic copper carbonate and the sulphur-containing sorbent material is heated to a temperature in the range 160 to 180° C.

* * * * *